United States Patent Office 3,338,438
Patented Aug. 29, 1967

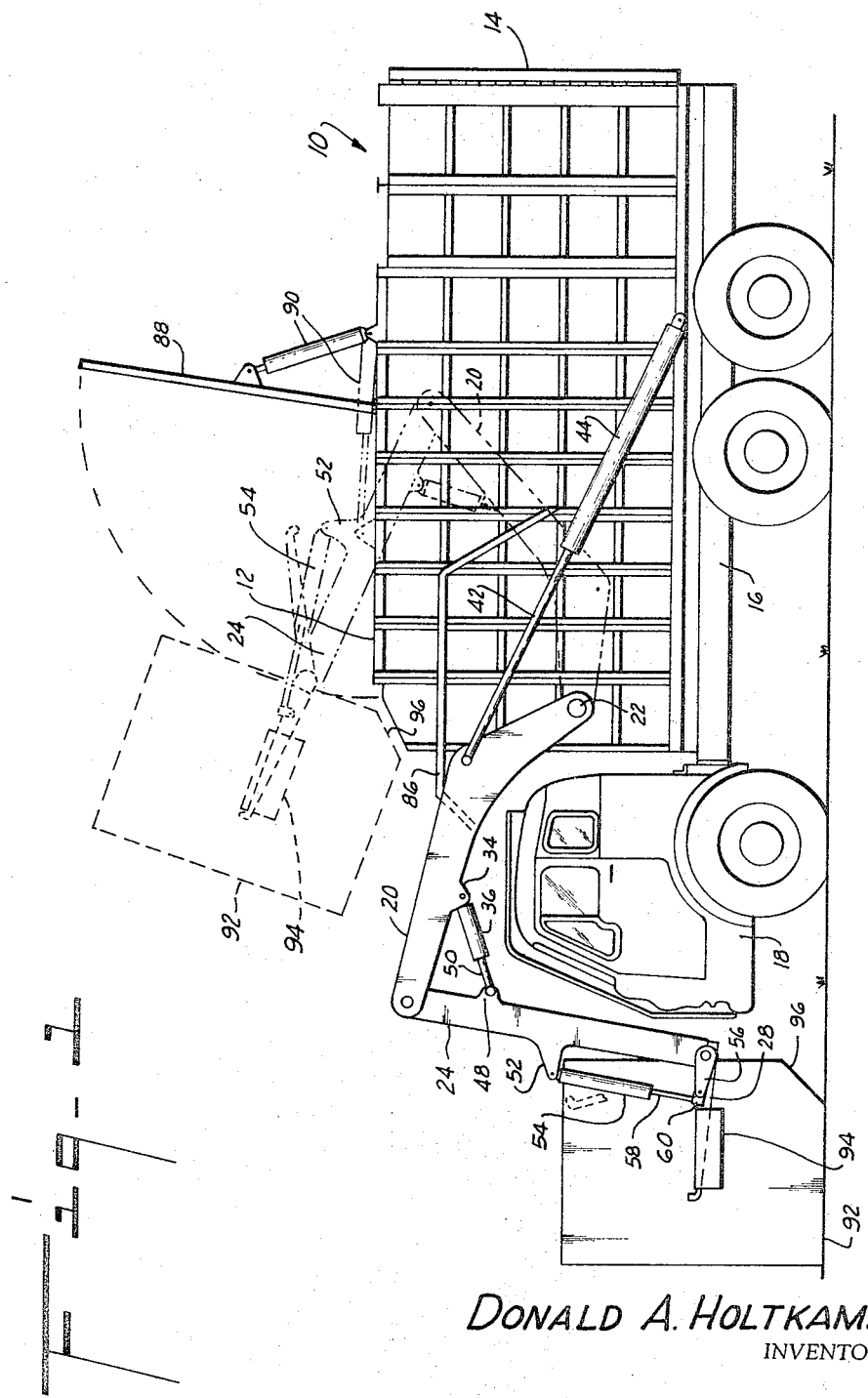

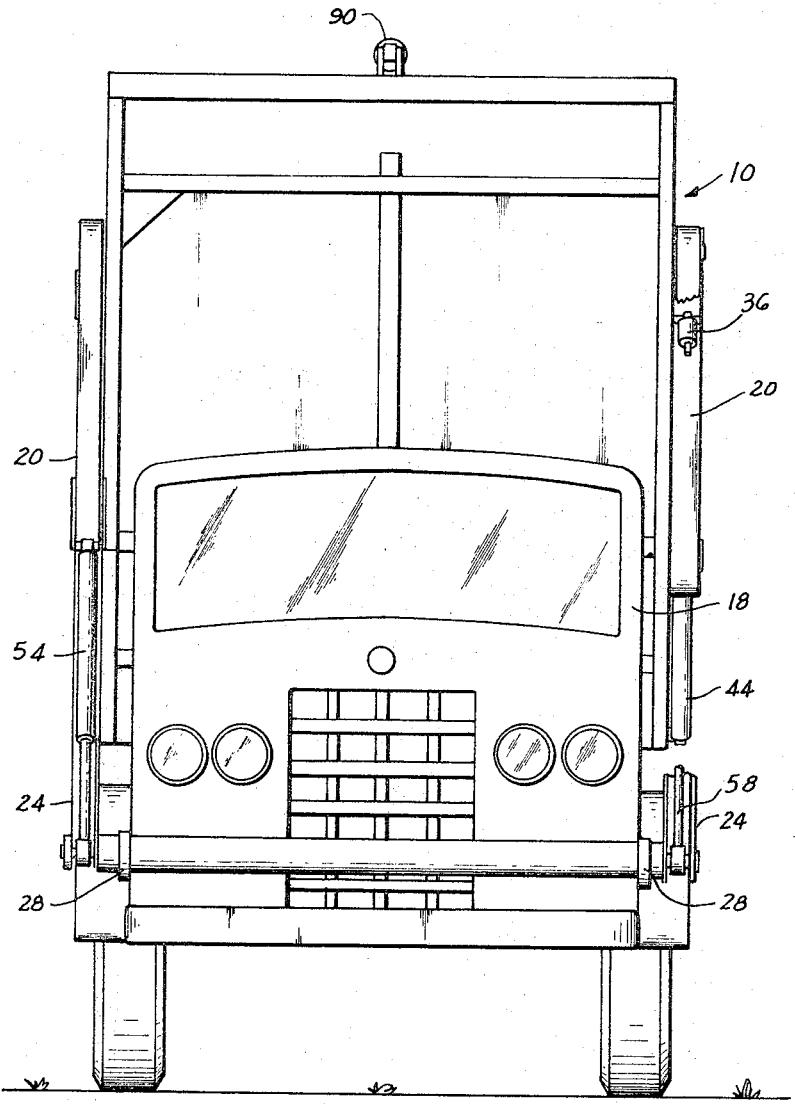

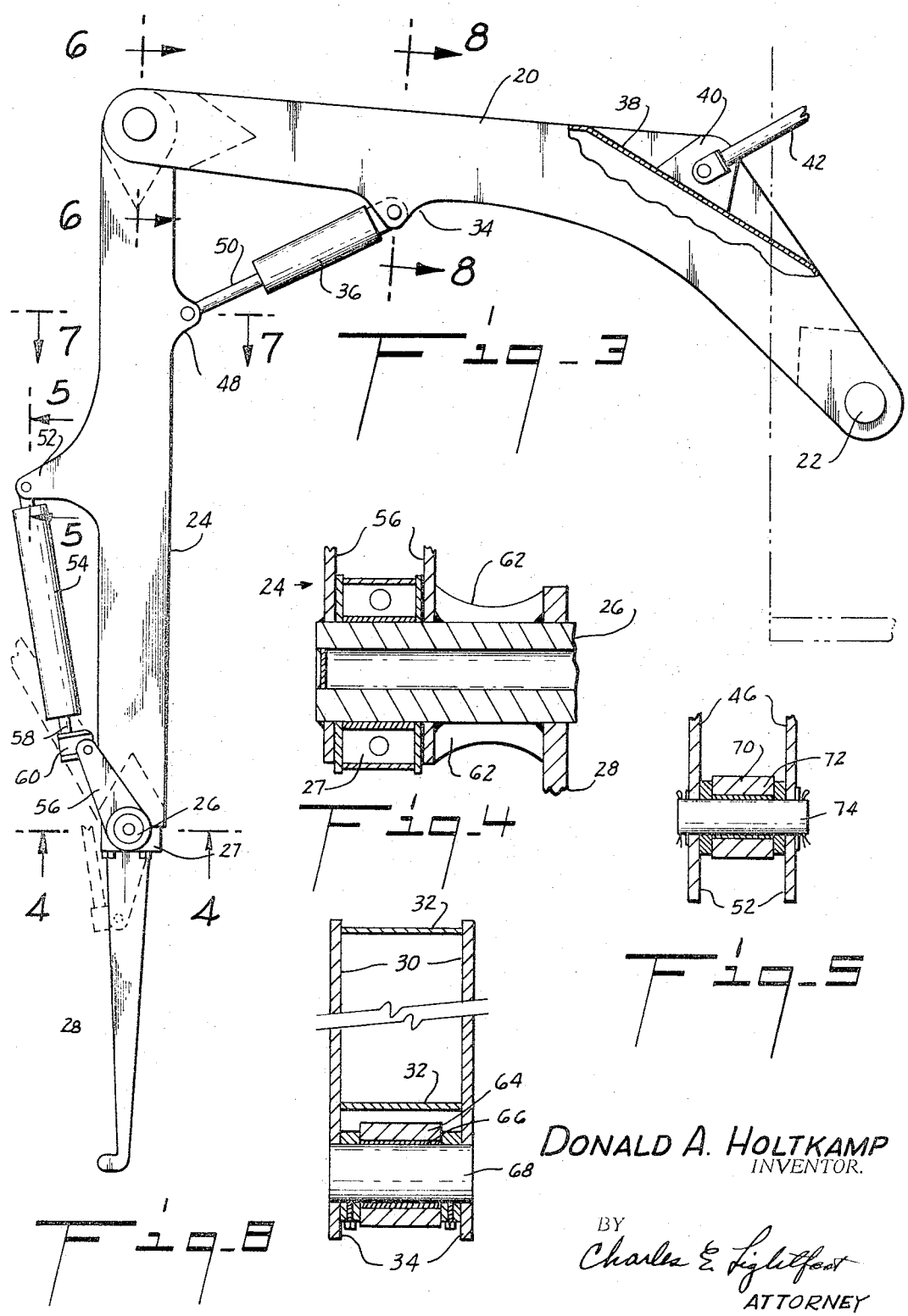

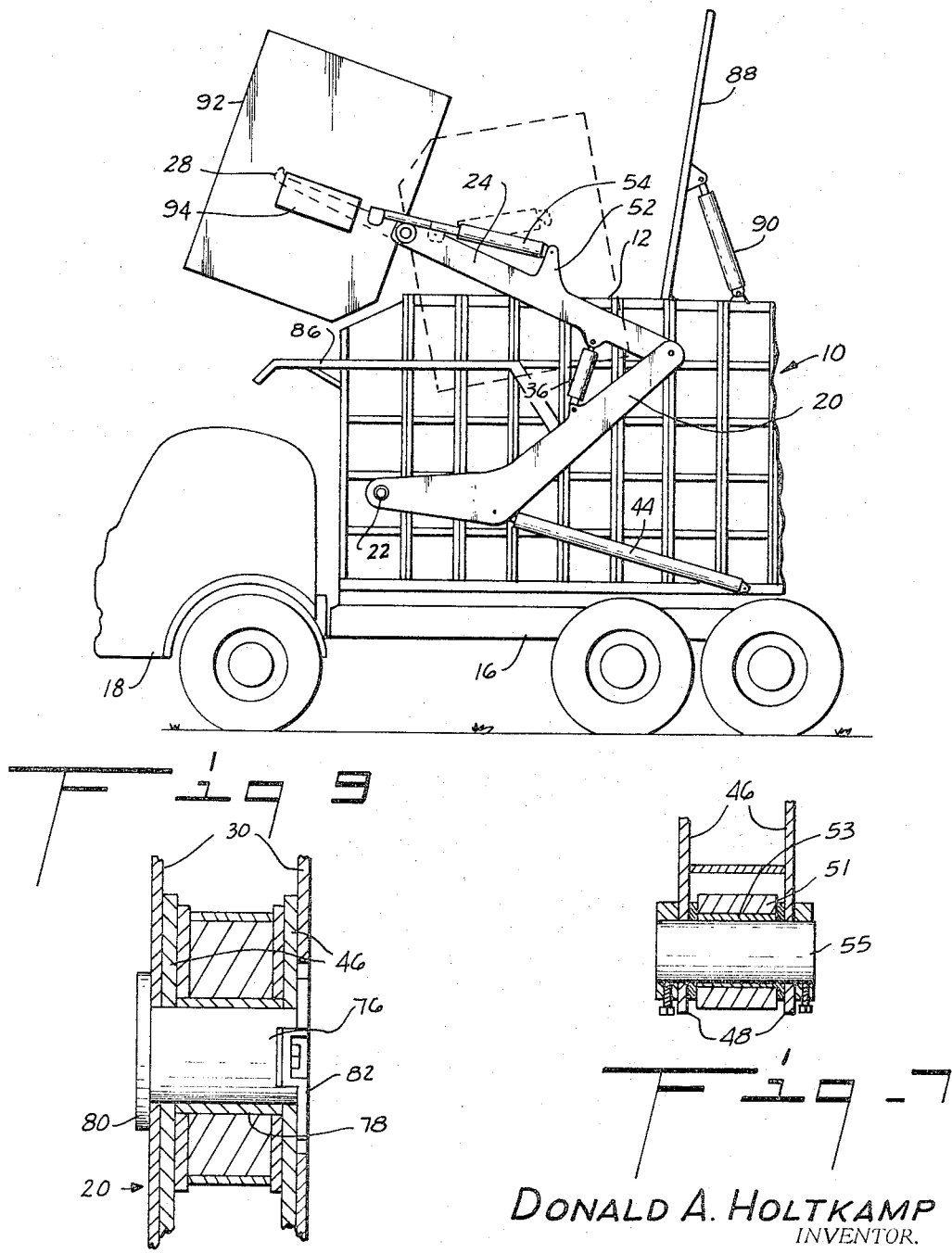

3,338,438
REFUSE COLLECTING VEHICLE WITH FRONT END CONTAINER LIFTING AND DUMPING MECHANISM
Donald A. Holtkamp, San Antonio, Tex., assignor to Pak-Mor Manufacturing Company, a corporation of Texas
Filed May 23, 1966, Ser. No. 552,326
6 Claims. (Cl. 214—302)

This invention relates to refuse collecting vehicles of the front end loading type and more particularly to a refuse vehicle having container lifting and dumping mechanism by which a container may be raised from the ground at the front end of the vehicle, elevated to a position to be dumped into an opening in the top of the vehicle body and inverted to empty the container into the vehicle.

The invention has for an important object the provision in a refuse vehicle of the front end loader type having mechanism for elevating a refuse container over the top of the cab of the vehicle for dumping into the body of the vehicle and which is constructed and connected to the vehicle at a location to distribute the load lifted thereby to both the front and rear axles of the vehicle whereby containers of maximum load capacity may be employed.

Another object of the invention is to provide container lifting mechanism for refuse collecting vehicles of the front end loading type which is constructed to extend over the cab of the vehicle when the mechanism is in its lowered position whereby the mechanism does not interfere with the opening of the side doors of the cab thus greatly increasing the safety of such mechanism.

A further object of the invention is the provision of refuse container lifting and dumping mechanism for refuse vehicles of the front end loader type having means for maintaining a refuse container in a substantially upright position during the elevation of the container to a position to be inverted to empty the container into the body of the vehicle.

Another object of the invention is to provide container lifting and dumping mechanism for refuse vehicles of the front end loader type having lifting boom means and container engaging means pivotally carried by the boom means and including hydraulically operable means for actuating the mechanism to elevate the boom means and operate the container engaging means to hold the container substantially upright until the container reaches a position to be emptied into the body of the vehicle, the container engaging means being then operable to invert the container.

A further object of the invention is the provision of container lifting and emptying mechanism for refuse vehicles of the front end loader type which is of simple design and rugged construction and which is designed to lift and invert containers of relatively large load capacity without danger of tipping the vehicle or overloading the running gear of the same.

The above and other obvious advantages of the invention will be apparent from the following detailed description of a preferred embodiment of the same when considered in conjunction with the annexed drawings, wherein:

FIGURE 1 is a side elevational view of a preferred embodiment of the invention showing the front end loading mechanism mounted on a refuse collecting vehicle and illustrating the manner in which the same operates in lifting a refuse container preparatory to dumping the same to empty the container into the body of the vehicle;

FIGURE 2 is a front end elevational view of the invention as illustrated in FIGURE 1, on a somewhat enlarged scale, the container lifting mechanism being shown in its lowered position with the refuse container removed;

FIGURE 3 is a fragmentary side elevational view, on an enlarged scale, showing one of the booms of the container lifting mechanism of the invention and its associated parts, the boom being shown in its lowered position and the container engaging mechanism thereof being shown in its released position;

FIGURE 4 is a cross-sectional view, on a greatly enlarged scale, taken along the line 4—4 of FIGURE 3, looking in the direction indicated by the arrows;

FIGURE 5 is a cross-sectional view, on a greatly enlarged scale, taken along the line 5—5 of FIGURE 3, looking in the direction indicated by the arrows;

FIGURE 6 is a cross-sectional view, on a greatly enlarged scale, looking in the direction indicated by the arrows;

FIGURE 7 is a cross-sectional view, on a greatly enlarged scale, taken along the line 7—7 of FIGURE 3, looking in the direction indicated by the arrows;

FIGURE 8 is a cross-sectional view, on a greatly enlarged scale, taken along the line 8—8 of FIGURE 3, looking in the direction indicated by the arrows; and FIGURE 9 is a fragmentary view similar to that of FIGURE 1 showing the container lifting mechanism in its raised position with the container elevated in position for the container dumping operation and illustrating the manner in which the container is emptied into the body of the vehicle.

Referring now to the drawings in greater detail the invention is illustrated herein in connection with a wheeled refuse vehicle or truck of the type having a hollow body generally designated 10, provided with a filling opening 12 in the top adjacent the front end of the body, and which may also be provided with the usual unloading opening at its rear end which is closed by a door 14. The body is mounted on the underframe 16 of the vehicle which is also provided with the usual cab 18 at the front end thereof.

The loading mechanism of the invention includes a pair of booms 20 located one on each side of the vehicle and pivotally connected at one end thereto for vertical swinging movement about an anchor shaft 22 extending horizontally across the body and which may also serve as a cross brace therefor, are located substantially below the top of the body 10 and mediate the front and rear wheels of the vehicle to distribute weight of the load lifted by the booms to the front and rear axles of the vehicle whereby heavy loads may be lifted without danger of overloading the axles or causing endwise tilting of the vehicle.

Each of the booms 20 carries at its forward end a lifting link 24, pivotally connected at its upper end to the forward end of the boom, which links carry at their lower ends a shaft 26 rotatably mounted thereon and extending horizontally between the links. Spaced apart, parallel, lift arms or forks 28 are also attached to the shaft 26 for rotation therewith, which arms extend laterally from the shaft.

The booms 20 are preferably of generally box-like construction in cross-section as best shown in FIGURE 8, each boom being made up of spaced apart, parallel, side plates 30, connected cross braces or plates 32. Each of the side plates 30 may be formed or provided with a downwardly projected perforated lug portion 34, mediate the ends of the boom for the pivotal connection thereto of one end of a link actuating cylinder 36.

Each boom is also provided with suitable reenforcing plates, such as those indicated at 39 and 40 in FIGURE 3 for the attachment thereto of the piston rod 42 of a boom operating cylinder 44.

Each of the links 24 is preferably made up of spaced, parallel plates 46, best seen in FIGURE 4, suitably connected together and formed with perforated lug portions 48 for the pivotal connection thereto of the piston rod 50 of the link actuating cylinder 36. The plates 46 of the links 24 are also formed with lug portions 52, mediate the lug portions 48 and the lower ends of the links, for the pivotal attachment thereto of the fork arm actuating cylinder 54.

The shaft 26 is rotatably mounted on the lower ends of the links 24, as by means of the bearings, as best shown in FIGURES 3 and 4, and has actuating arms 56 for each of the fork arms 28, the actuating arms being rigidly connected to the shaft to rotate the shaft and being pivotally connected at their outer ends to the piston rods 58 of the fork arm actuating cylinders 54, by means of the offset link connections 60, best seen in FIGURE 3, so that the fork arms 28 will be swung downwardly upon extension of the piston rods 58 and moved upwardly upon retraction thereof.

The fork arms 28 may also be connected to the shaft 26 by filler plates 62 which are welded in place and also welded to the inner ones of the arms 45, as shown in FIGURE 4, whereby the application of torque to the shaft 26 by the arms 56 upon the lifting of a load on the fork arms 28 will be substantially eliminated.

The structure of the pivotal connection of the cylinder 36 to the lugs 34 of each boom is shown in detail in FIGURE 8, wherein the cylinder is shown as having a perforated lug 64 as its head end in which a suitable bearing 66 is disposed through which bearing a pin 68 is extended through the lugs 34. A similar connection is provided between the piston rod 50 and the lugs 48 of the links 24, as seen in FIGURE 7, wherein the piston rod 50 has a perforated end portion 51 in which a bearing 53 is positioned, through which a pin 55 is extended through the lugs 48.

The pivotal connection of the head end of the fork arm actuating cylinders 54 to the links 24 is shown in detail in FIGURE 5, wherein the head end of the cylinder has a perforated lug 70, for the reception of a bearing 72 through which a pin 74 is extended through the lugs 52.

The pivotal connection between the booms 20 and the upper ends of the links 24 is illustrated in detail in FIGURE 6, wherein the upper perforated ends of the plates 46 of the link are shown positioned between the perforated ends of the plates 30 of the boom, a pin 76 being extended through the perforation of the plates and through a bearing 78 located between the plates 46. The pin 76 is preferably of a type having an enlarged, flattened head 80 at one end which engages the outer face of one of the plates 30 of the boom and the pin is provided with a detachable end plate 82 which is disposed in an enlarged opening 84 in the inner one of the boom plates 30 in engagement with the outer face of the adjacent one of the link plates 46. By this arrangement there will be no inward projection of the pin 76 beyond the inner one of the boom plates so that there will be no interference with the free vertical swinging movement of the boom alongside of the body of the vehicle.

The body of the vehicle may be provided with wear strips, such as that shown at 86, extending along the exterior of each side wall of the body in position for engagement with the booms 20 to prevent the booms from rubbing against the walls of the body during vertical swinging movements of the booms.

The body of the vehicle is provided with a door 88 for the filling opening 12, which door is hinged to swing vertically and may be opened and closed by a pressure cylinder 90 in a well known manner.

The vehicle is, of course, provided with a pressure fluid system, such as a hydraulic system of a well know type having suitable connections, such as flexible pressure lines, not shown, to each of the cylinders 36, 44 and 54, under the control of suitable valve mechanism, also not shown, whereby the actuation of these cylinders may be coordinated in operating the loading mechanism.

The lifting mechanism is designed to be used with refuse containers, such as that indicated at 92, which in the present illustration are of generally cubical shape, open at the top and having brackets 94 on opposite side walls thereof at a suitable distance above the bottom of the receptacle within which the fork arms 28 are insertable to support the receptacle on the fork arms when lifted.

In the operation of the mechanism, constructed as described above, the vehicle is moved up to a container to be lifted, the booms 20 being in their lower positions, extending forwardly above the cab 18 of the vehicle and the links 24 extending downwardly in front of the vehicle with the fork arms extending forwardly, as seen in FIGURE 1. With the apparatus thus disposed the vehicle is moved toward the receptacle or container 92 to insert the fork arms in the brackets 94, as shown in FIGURE 1, whereupon the receptacle may be lifted.

The receptacle having been thus engaged, the cylinders 44 are actuated to raise the boom 20 and the links 24 therewith to elevate the receptacle over the cab 18 to the filling opening 12. The receptacle 92 may be formed along one side at the bottom thereof with an external sloping face portion 96 positioned to engage the upper edge portion of the front end of the body of the vehicle to aid in inverting the receptacle when it has reached the proper elevation.

During the elevating of the receptacle as described above the cylinders 36 are actuated to swing the links 24 toward the booms 20 in a scissors like motion, while the cylinders 54 are actuated to extend the piston rods 58 to maintain the fork arms 28 nearly horizontal, thus holding the receptacle in a substantially upright condition during the upward swinging of the receptacle to its elevated position. The receptacle may then be inverted while in its elevated position by actuation of the cylinders 54 to swing the fork arms 28 clockwise, as seen in FIGURE 1, to empty the receptacle into the body 10.

After being emptied the receptacle may be righted and and repositioned on the ground by a reversal of the lifting and inverting operation.

It will be noted that due to the positioning of the connections of the cylinders 44 to the vehicle and to the booms and the positioning of the pivotal connection 22 of the booms 20, as well as the somewhat angular shape of the booms, these points of connection will never be in a straight line, the connection between the piston rods 42 and the booms being always somewhat above a line through the pivotal connections 22 and the connections between the cylinders 44 and the vehicle, so that there is no possibility of the mechanism becoming locked in its elevated position.

Moreover, because of the scissors connection between the links 24 and booms 20 and the adjustability of the fork arms by vertical swinging movement, the lift mechanism may be used to pick up and replace receptacles which are disposed on elevated platforms or docks, or to reach receptacles in locations which do not allow the vehicle to be moved into close proximity with the receptacles.

It will thus be seen that the invention provides receptacle lifting and dumping mechanism for refuse vehicles which is of simple design and rugged construction, which is flexible in its operation, and by which receptacles may be lifted over the top of the vehicle cab in an upright condition and inverted to empty the same into the vehicle body.

The invention is disclosed herein in connection with a particular embodiment of the same, which it will be understood is intended by way of illustration only, it being apparent that various modifications may be made in the construction and arrangement of the parts, within the spirit of the invention and the scope of the appended claims.

Having thus clearly shown and described the invention, what is claimed as new and desired to secure by Letters Patent is:

1. The combination with a refuse vehicle of the front loading type having a hollow body and a cab in front of the body, of loading mechanism comprising a pair of booms, means forming a pivotal connection between the rear end of each boom and the body at a location between the top and bottom of the body, to allow the booms to swing vertically, a lifting link pivotally connected at one end to the forward end of each boom for movement therewith to a lowered position in which the boom extends forwardly above and said link extends downwardly in front of said cab to an elevated position in which said boom extends upwardly and rearwardly along one side of the body and said link extends angularly upwardly and forwardly from the boom with the free end of the link positioned above the top of the body, power means connected to the body at locations rearwardly of and below the pivotal connection of the booms to the body and connected to the booms at points located to lie above a line passing through the pivotal connections of the booms to the body and the pivotal connections between the booms and links when the booms are in said lowered position and below said line when the booms are in said elevated position, power means connected to said booms and links at locations to move the links toward said booms during movement of the booms from said lowered to said elevated position, a pair of fork means forming pivotal connections between the fork arms and links adjacent the free ends of the links to allow the arms to swing vertically from a forward position extending forwardly from the cab when the links are lowered to a rearward position extending rearwardly above said body when said links are elevated, and power means connected to said links and arms at locations to move the arms from forward to said rearward position during movement of said links from said lowered to said elevated position.

2. The combined vehicle and loading mechanism of claim 1 wherein the means forming a pivotal connection between the rear end of each boom and the body comprises a shaft extending transversely across the body interiorly of the body.

3. The combined vehicle and loading mechanism of claim 1 wherein the means forming pivotal connections between the fork arms and links comprises a shaft extending between and rotatably mounted on the links.

4. The combined vehicle and loading mechanism of claim 1, wherein said booms and links each comprises a pair of elongated, spaced apart, parallel plates and transversely extending means connecting said plates together.

5. The combined vehicle and loading mechanism of claim 1 wherein each of said power means includes a pressure fluid cylinder.

6. The combined vehicle and loading mechanism of claim 1 further comprising means on the body positioned for engagement with the booms to hold the booms out of contact with the sides of the body during vertical swinging movement of the booms.

References Cited
UNITED STATES PATENTS

| | | | |
|---|---|---|---|
| 2,949,199 | 8/1960 | Jones | 214—302 |
| 3,140,787 | 7/1964 | Clar | 214—302 |

HUGO O. SCHULZ, *Primary Examiner.*